Figure 1:
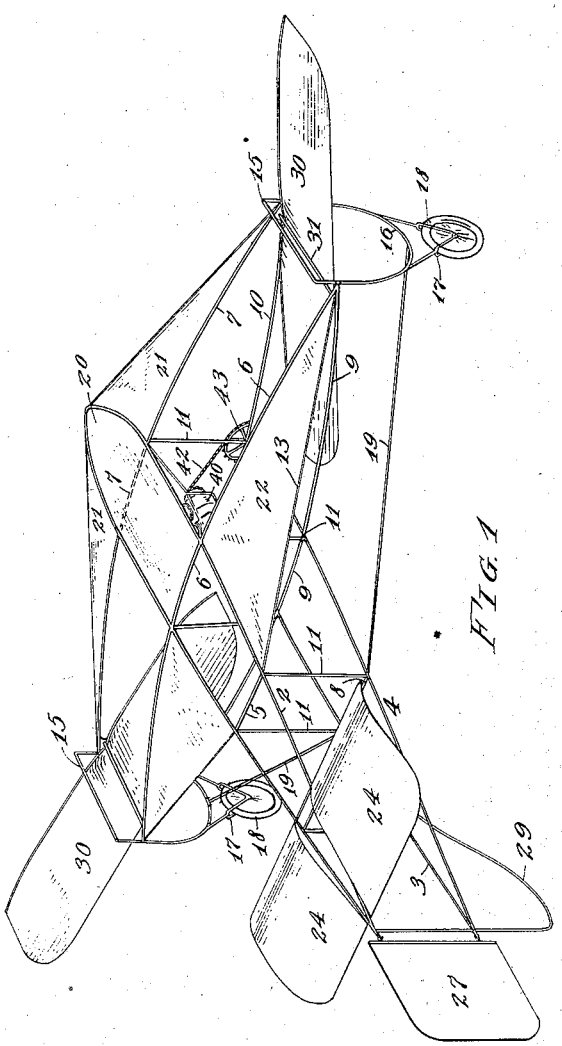

H. C. GAMMETER.
FLYING MACHINE.
APPLICATION FILED NOV. 17, 1911.

1,135,009.

Patented Apr. 13, 1915.
2 SHEETS—SHEET 1.

WITNESSES:
Brennan B. West.
Chas. Q. Watt

INVENTOR,
Harry C. Gammeter,
By Albert H. Bates,
ATTY.

H. C. GAMMETER.
FLYING MACHINE.
APPLICATION FILED NOV. 17, 1911.

1,135,009.

Patented Apr. 13, 1915.
2 SHEETS—SHEET 2.

WITNESSES:

INVENTOR,
Harry C. Gammeter,
BY Albert N. Bates,
ATTY.

UNITED STATES PATENT OFFICE.

HARRY C. GAMMETER, OF BRATENAHL, OHIO.

FLYING-MACHINE.

1,135,009.  Specification of Letters Patent.  Patented Apr. 13, 1915.

Application filed November 17, 1911. Serial No. 660,833.

*To all whom it may concern:*

Be it known that I, HARRY C. GAMMETER, a citizen of the United States, residing at Bratenahl, in the county of Cuyahoga and State of Ohio, have invented a certain new and useful Improvement in Flying-Machines, of which the following is a full, clear, and exact description, reference being had to the accompanying drawings.

This invention relates to flying machines operating on the movable wing principle.

The object of the invention is to provide such a machine in a form which will require comparatively little power for its operation, and shall be stable and effective in use, as well as being simple and cheap in construction. To this end I have provided a central support for the driving mechanism, and a pair of wings on opposite sides thereof, each centrally pivoted on a longitudinal axis, the wings being connected with the driving mechanism, whereby they may oscillate simultaneously about their respective axes. The central pivoting of the wings balances them, making the stroke equal in either direction and enables the power to be regular, and my invention comprises such a construction broadly.

The more particular embodiment of this inventive idea, as illustrated in the drawings hereof, is also comprised within my invention.

Figure 2:
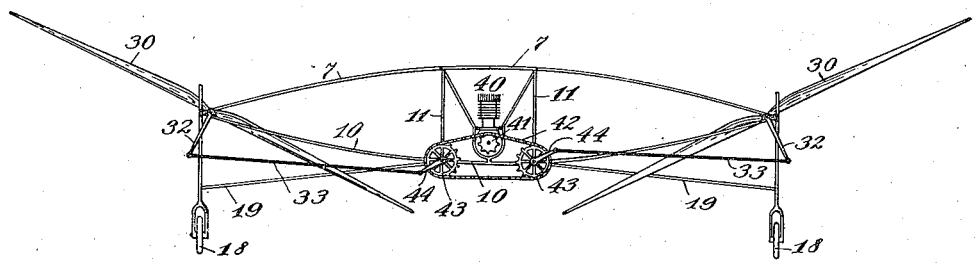
Figures 4, 5:
Figure 3:
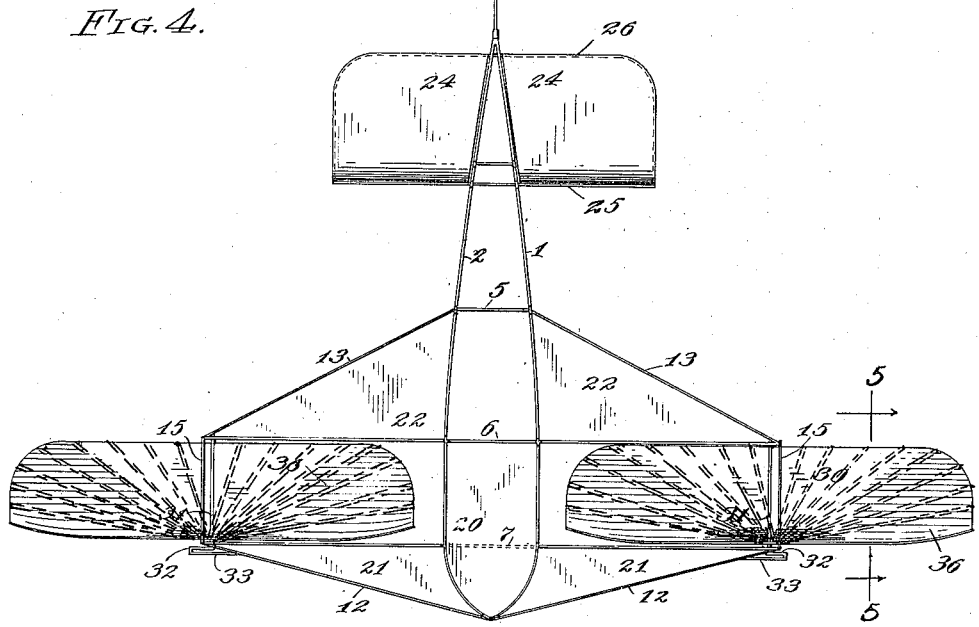

In the drawings, Figure 1 is a perspective view of a flying machine embodying my invention; Fig. 2 is a front elevation thereof; Fig. 3 a plan. In each view the controlling levers and connecting links for operating the steering mechanism, etc., and other details, are omitted for clearness of illustration. Fig. 4 is a cross section of a wing somewhat enlarged, showing the valves open. Fig. 5 is a section taken through a wing at a point indicated by line 5—5 of Fig. 3 and shows in broken lines the flexion of the wings.

As shown in the drawings, the frame of my flying machine consists of an approximately cross-shaped skeleton structure, having a central longitudinal frame portion and transverse skeleton arms projecting from the sides thereof. The central portion of the frame, as shown, consists of the longitudinal bars 1 and 2 connected together at their ends and suitably spaced apart, and similar longitudinal bars 3 and 4 connected at their ends and intermediately spaced apart and lying in a plane below the bars 1 and 2 and connected with them by suitable uprights. The drawings show the spacing of the members 1 and 2 accomplished by the transverse members 5, 6 and 7 secured thereto. Similarly, the bars 3 and 4 are shown as spaced by the bars 8, 9 and 10, and the upper and lower frames spaced by various uprights, designated 11, secured to the longitudinal bars at the junction of the transverse bars. This makes a well-braced central frame of very light construction.

The lateral arms referred to are made by extending the cross bars 6 and 9 and 7 and 10 outwardly in opposite directions and bowing them together, the ends being secured by cross members 15. These cross members are shown as made of rods bent into an annular form connected with the points of the two lateral arms and extending above and below such points of connection: Near their lower ends these cross frames are shown as terminating in forks 17 in which are mounted supporting wheels 18. These annular frames are braced in a suitable manner, as, for example, by the diagonal bars 19.

The supporting surfaces of the machine, made preferably of light fabric, are partly stationary and partly movable. The stationary supporting surfaces shown include the central sheet 20 within the upper horizontal frame, and the four triangular sheets 21, 21 and 22, 22 respectively, in front of and at the rear of the extending portions of the bars 7 and 6. These triangular sheets are bounded by the central frame, the bars mentioned and the brace rods 12 and 13.

The movable supporting surface consists principally of the wings 30. These occupy the open space between the two lateral arms on each side and are pivoted at their centers on longitudinal axes at the outer ends of such arms and oscillate about such axes. As shown, each wing is mounted on a longitudinal rock shaft 31 journaled in suitable bearings adjacent to the points of the lateral frame arms. Extending from the rock shafts 31 are rock arms 32. From the lower ends of these rock arms pitmans 33 lead inwardly toward the central frame and are connected with suitable operating mechanism mounted thereon and adapted to cause the wings to operate in unison to swing both inner edges downwardly or upwardly together and the outer edges correspondingly.

As shown, the driving device carried by the central frame consists of the engine or motor 40 suitably mounted within the central frame and having a pinion 41. Over this pinion extends a sprocket chain 42 passing around two sprocket wheels 43 adjacent to the forward end of the frame. Each sprocket wheel has connected with it a crank arm 44 which connects with the corresponding pitman 33. The two arms 44 extend in diametrically opposite directions so that the desired movement of the wings is obtained from a continuous rotation of the driving pinion 41.

The mechanism described serves to oscillate the wings, causing both inner halves and then both outer halves to strike downward onto the air. The wing-halves are formed to meet less air resistance on the upward stroke, so that their oscillation lifts the machine. This is accomplished in part by having the edges of the wings flexible downwardly so that they may bend on the up stroke. It is further accomplished by having the wings bowed upwardly or parabolic as shown in the drawings. By having the wings flexible and parabolically curved in a fore-and-aft direction, a forward propelling action is also obtained from the up and down movement. It is further desirable to make the wings valvular (of the style shown in my former Patent No. 968,931) to diminish the resistance on the up stroke, and such is the construction shown conventionally at 36 in the drawing. This valvular action may be easily obtained by making this part of the wing of strips of fabric, each secured at one edge to a suitable rib and overlapping the adjacent strip on its under side.

In addition to the stationary and wing supporting surfaces described, it is desirable to provide the central frame with a rear supporting surface, which is shown as consisting of the two sheets 24 mounted on the cross bars 25 and 26 secured to the bars 1 and 2. This construction may be movable to control the angle of elevation. At the rear end of the frame is the rudder 27 mounted on a vertical pivot. Near the rear end of the frame is a suitable depending shoe 29 which, with the two wheels 18, makes a three-point support for the machine when on the ground.

The frame of my machine may be very simply constructed of metal or wood and readily adapts itself to being strong and stiff, and at the same time very light. The various supporting fabrics are easily carried by frame bars, as described. The wings may likewise be simply constructed of a suitable frame with light fabric. The driving mechanism is very simple and direct. The aviator sits directly behind the engine, on any suitable seat, which may be carried by the bars 3 and 4. In this position he may conveniently control the engine and the steering levers, as well as properly balance the machine.

By having the front edge of the wing stiff and the rear edge flexible, there is a propelling action for the full width of both wings on each stroke, since the part of the wings which is moving upwardly bends downward at the rear edge, while the part which is moving downwardly bends upward at the rear edge. This makes the propelling action powerful and substantially continuous. The balancing of the wings by the central pivoting equalizes the force required and reduces the maximum power which it is necessary to carry. Thus, my machine, while being simple in construction and operation, as above explained, has the further very important feature of requiring comparatively small power to effect its raising and propulsion.

Having thus described my invention, what I claim is:

1. In a flying machine, the combination, with a frame, of two wings flexible at their rear and inner and outer edges and provided with valves opening downwardly and each pivotally mounted adjacent to the center of the wing, one of the wings being placed each side of the center of flight, and means for oscillating such wings about their axes.

2. In a flying machine, the combination, with a central frame, of two laterally extending frames on each side of the central frame, a pair of wings on opposite sides of the central frame between the lateral frames, each wing being upwardly bowed and having flexible edges and made valvular and pivotally mounted at its lateral center on a longitudinal axis adjacent to the outer ends of the corresponding lateral frames.

3. The combination of a central frame, a pair of lateral frames extending from each side of the central frame and spaced apart, a pair of wings swinging in such spaces and each pivoted adjacent to its center on a longitudinal axis carried at the outer ends of the lateral frames, cross connections between the outer ends of the lateral frames, and diagonal braces between the outer ends of each lateral frame and the longitudinal frame at parts forward of and at the rear of the lateral frames.

4. In a flying machine, the combination of a central frame, lateral frames extending on each side thereof and standing one at the rear of the other, diagonal braces extending from the outer ends of the lateral frames to the central frame, a pair of wings pivoted in the spaces between the pair of lateral frames respectively, each wing being mounted on a longitudinal rock shaft adjacent to the center of the wing and journaled in the lateral frames, a rock arm on each rock shaft, a driving mechanism mounted on the central frame, and pitmans connecting said mechanism with the respective rock arms.

5. The combination of a central frame, two laterally extending supports one on each side of the frame, a pair of wings each pivotally mounted on said supports intermediate of the inner and outer edges of the wings, a pair of driving wheels spaced apart, a central motor, a sprocket chain connecting the motor and the two driving wheels, whereby the wings are oscillated.

6. In a machine of the character described, the combination of a central frame having upper and lower frame members and suitable upright braces, lateral frames carried by the central frame, wings hinged intermediate of their edges on longitudinal axes carried by the lateral frames, and supporting fabrics exterior to the lateral frames and to the longitudinal frame and secured to them.

7. The combination of upper and lower central frames properly braced apart, a pair of lateral frames on each side of the central frame, a pair of wings each hinged adjacent to the center by a longitudinal axis carried by the lateral frames near their outer ends, and triangular supporting fabrics carried by the upper members of the central and lateral frames.

8. In a machine of the character described, the combination of a central frame comprising upper and lower frame members braced apart, lateral frames extending from opposite sides of the central frame and comprising bars leading from the upper and lower central frame members respectively and being brought together at the outer ends of the lateral frames, a bracing frame connecting the outer ends of the two lateral frames on each side, and wings pivotally mounted between the lateral frames.

9. In a machine of the character described, the combination of a central frame comprising upper and lower frame members spaced apart, and lateral members on opposite sides of the central frame and each consisting of extensions of an upper and lower cross member on the central frame, said extensions being brought together at their outer ends, an annular bracing frame connecting the outer ends of the two lateral frames on each side, and wings within the bracing frames and pivotally mounted on longitudinal axes supported by the lateral frames.

10. The combination of upper and lower central planes properly braced apart, a pair of lateral frames on each side of the central frame, an arcuate bracing frame connecting the outer ends of the two lateral frames on each side, supporting wheels mounted on these arcuate frames, a pair of wings each hinged adjacent to the center by a longitudinal axis carried by the lateral frames near their outer end, and supporting fabric carried by the upper members of the central and lateral frame.

11. In a machine of the character described, the combination of a central frame, a laterally extending support on each side of the frame; a pair of wings carried thereby, each wing being pivotally mounted on a central longitudinal axis in one of the supports, the two halves of each wing on opposite sides of the axis being substantially rigid with each other though flexible at the rear and each being parabolic laterally from the axis and each parabolic longitudinally from the front edge of the wing.

12. In a machine of the character described, the combination of a central frame, a laterally extending support on each side of the frame, a pair of wings carried thereby, each wing being pivotally mounted on a central longitudinal axis in one of the supports, the two halves of each wing on opposite sides of the axis being substantially rigid with each other while each half is independently bowed upwardly, each wing having valves in each half adapted to allow the relatively downward passage of air through the wing, and mechanism mounted on the central frame for concurrently oscillating the two wings.

13. In a machine of the character described, the combination of a central frame comprising upper and lower frame members suitably spaced apart, two pairs of lateral frames comprising extensions of spacing bars on the central frame, which extensions are brought together at their outer ends, bracing frames at such outer ends connecting the two lateral frames on that side, supporting wheels carried by such bracing frames, and pivotally mounted wings carried by the lateral frames.

14. The combination of a central frame having upper and lower frame members spaced apart, lateral frame members projecting from the central frame, wings, pivotally carried by the lateral frame members, supporting fabrics secured to the upper, lateral and logitudinal frame members, a supporting fabric carried by the upper frame members near their rear ends, and a vertical rudder at the rear end of the central frame.

15. In a machine of the character described, the combination, with a frame, of a pair of laterally alined separated wings pivotally mounted on longitudinal axes side by side and respectively on opposite sides of the center, each wing being stiff at its forward edge and flexible at its rear edge.

16. In a flying machine, the combination of a central frame, lateral frames extending therefrom on opposite sides, two wings each hinged adjacent to their centers to the lateral frames on one side, each side of each wing being stiff on its forward edge and flexible on its rear edge, driving mechanism on the central frame, and connections between such driving mechanism and the respective wings.

17. In a flying machine, the combination with a central frame, of two laterally extending frames on each side of the central frame, braces extending diagonally from the lateral frames to the central frame, a pair of wings on opposite sides of the central frame carried between the lateral frames, each wing being pivotally mounted intermediate of its ends in the lateral frames, and means carried by the central frame for oscillating the wings.

In testimony whereof, I hereunto affix my signature in the presence of two witnesses.

HARRY C. GAMMETER.

Witnesses:
ALBERT H. BATES,
BRENNAN B. WEST.